Sept. 10, 1963 L. SZILARD 3,103,475
REACTOR
Filed Sept. 20, 1946 13 Sheets-Sheet 2
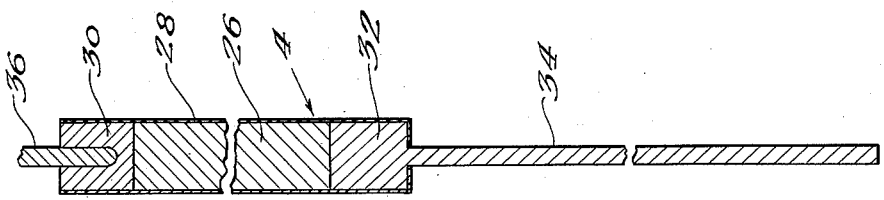
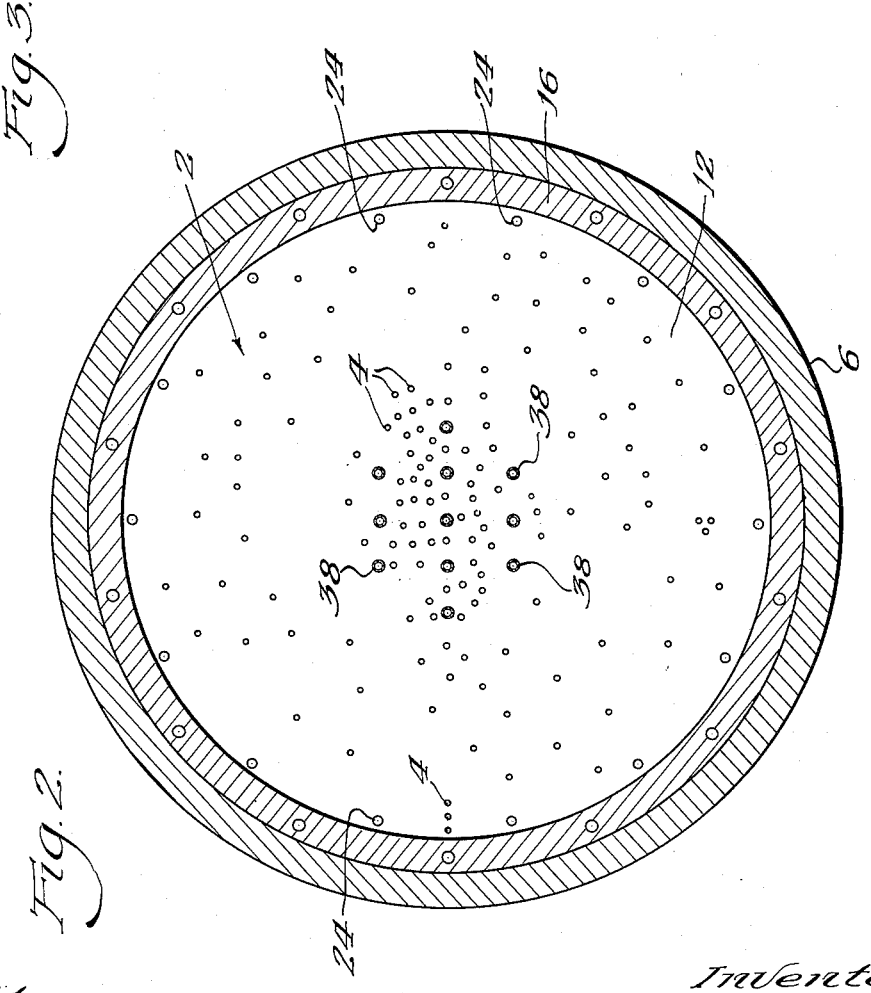
Witness:
Walter S. Schlegel, Jr.
Inventor:
Leo Szilard
By
Attorney

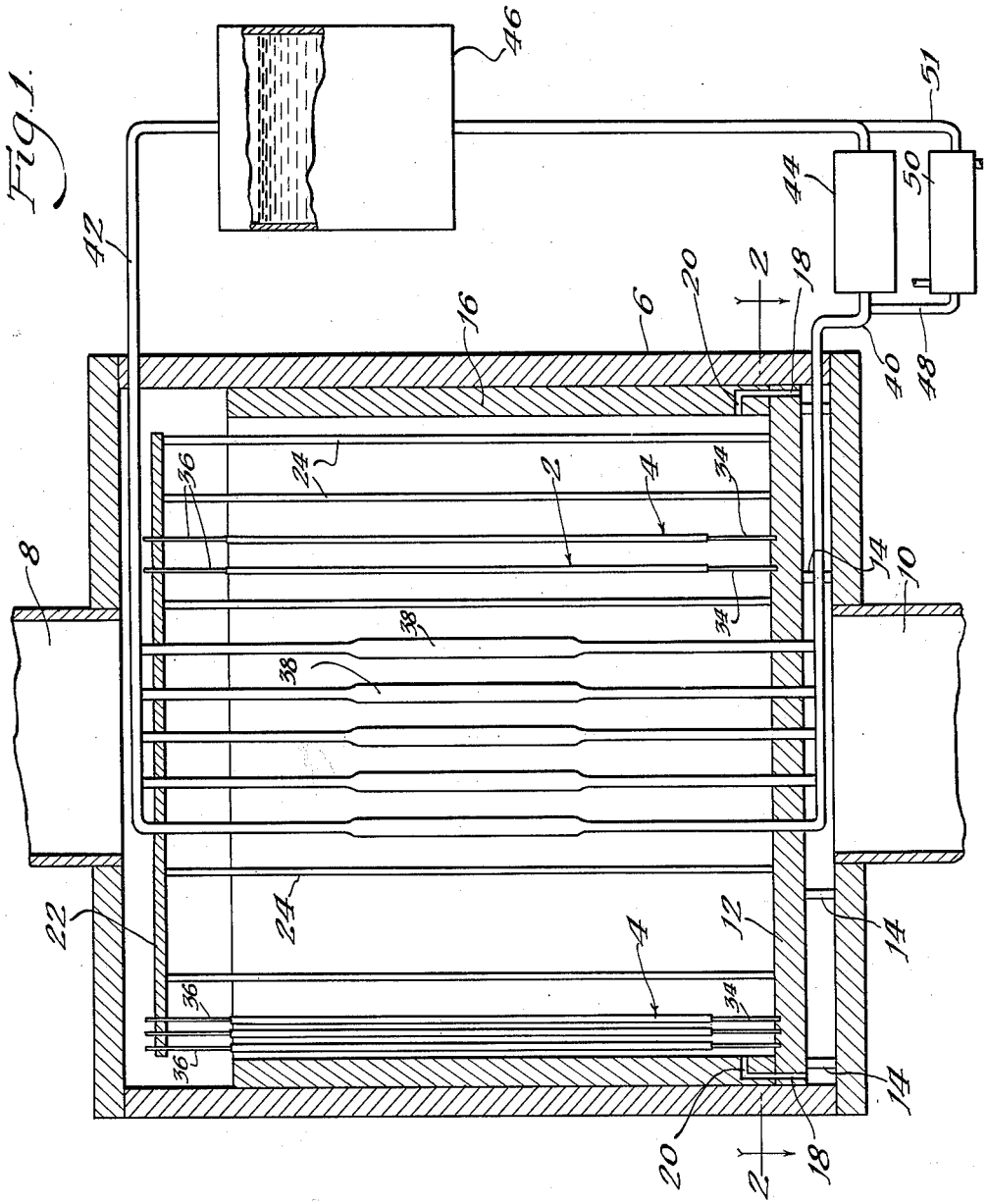

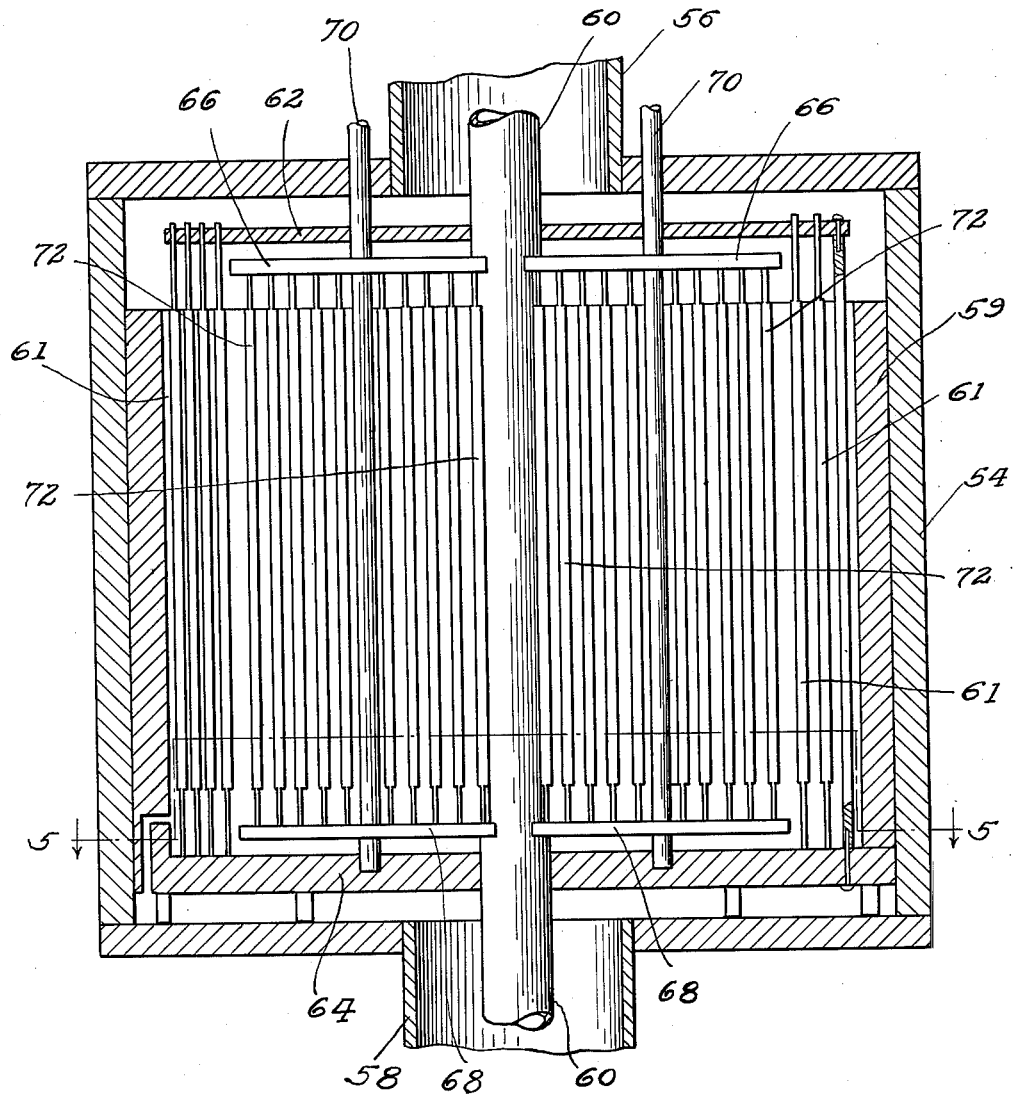

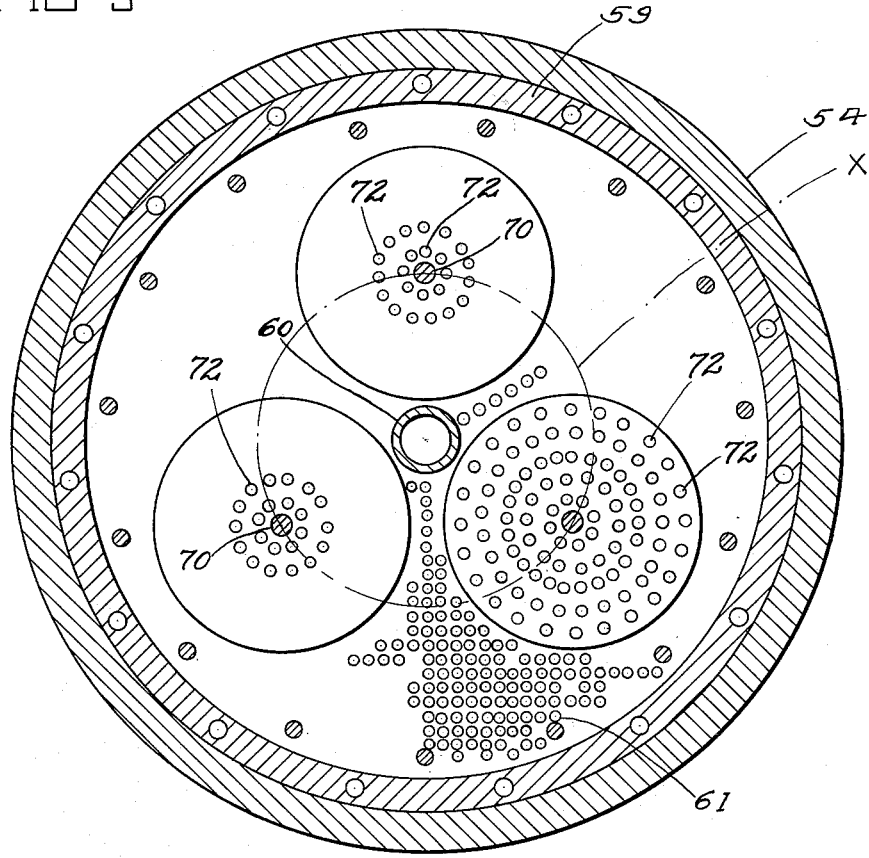

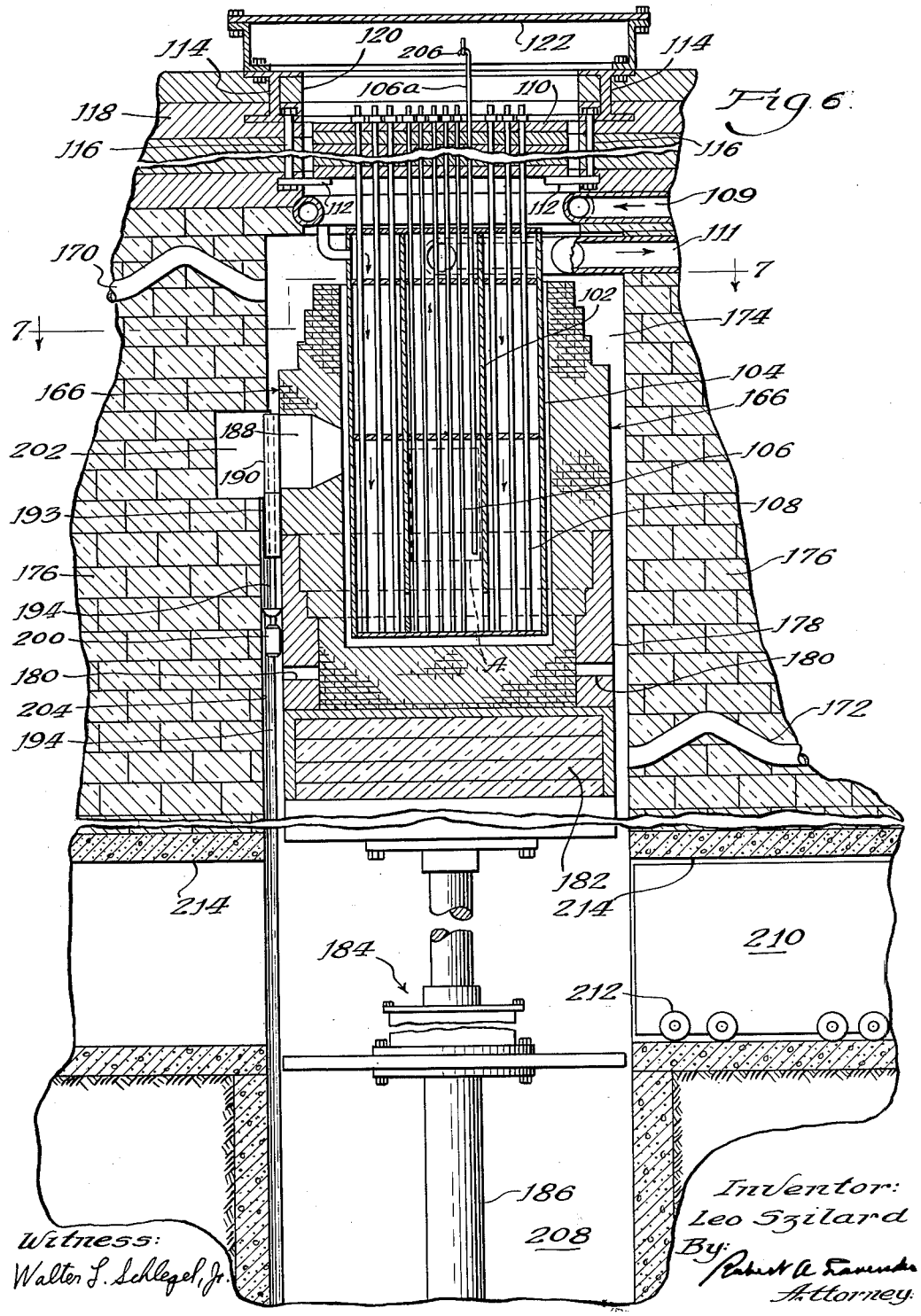

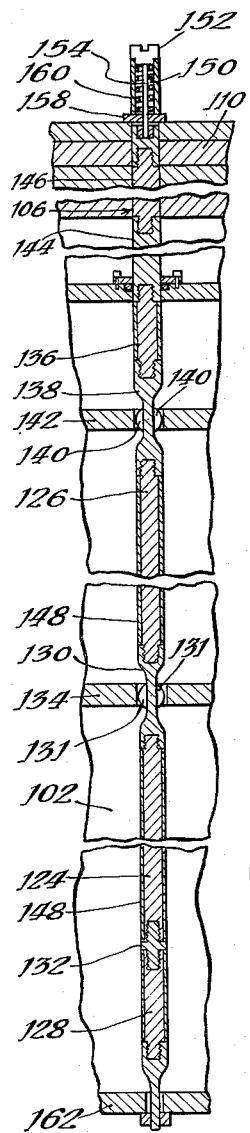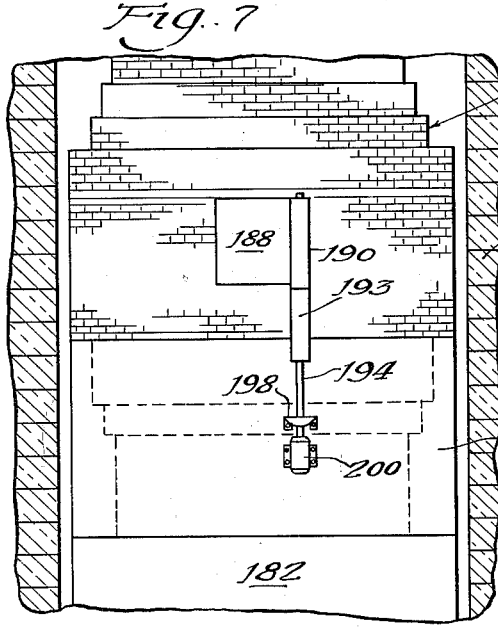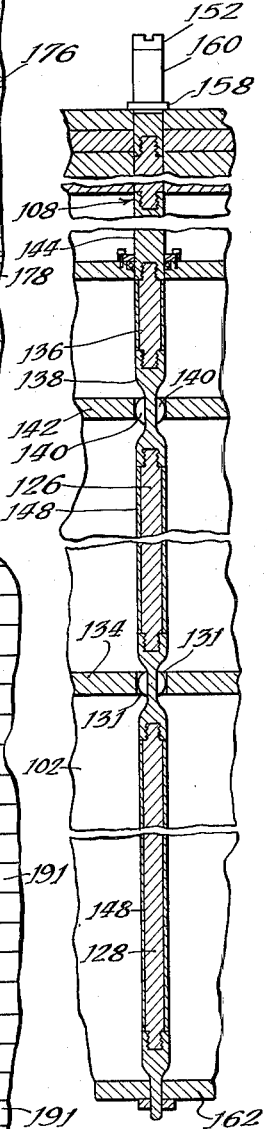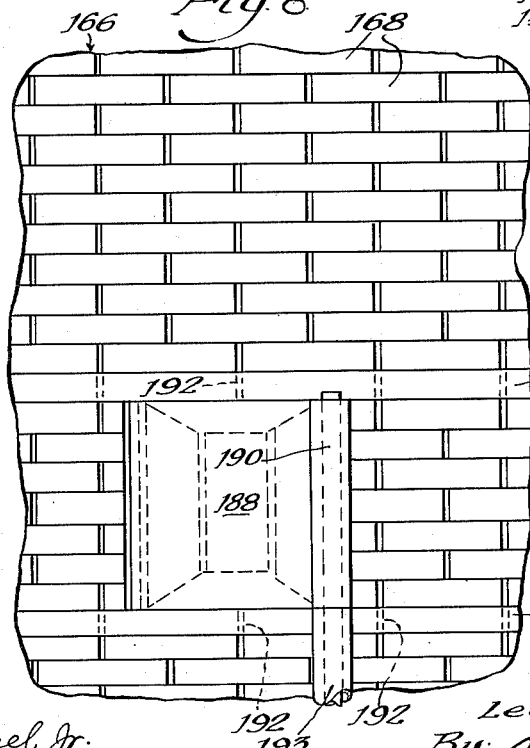

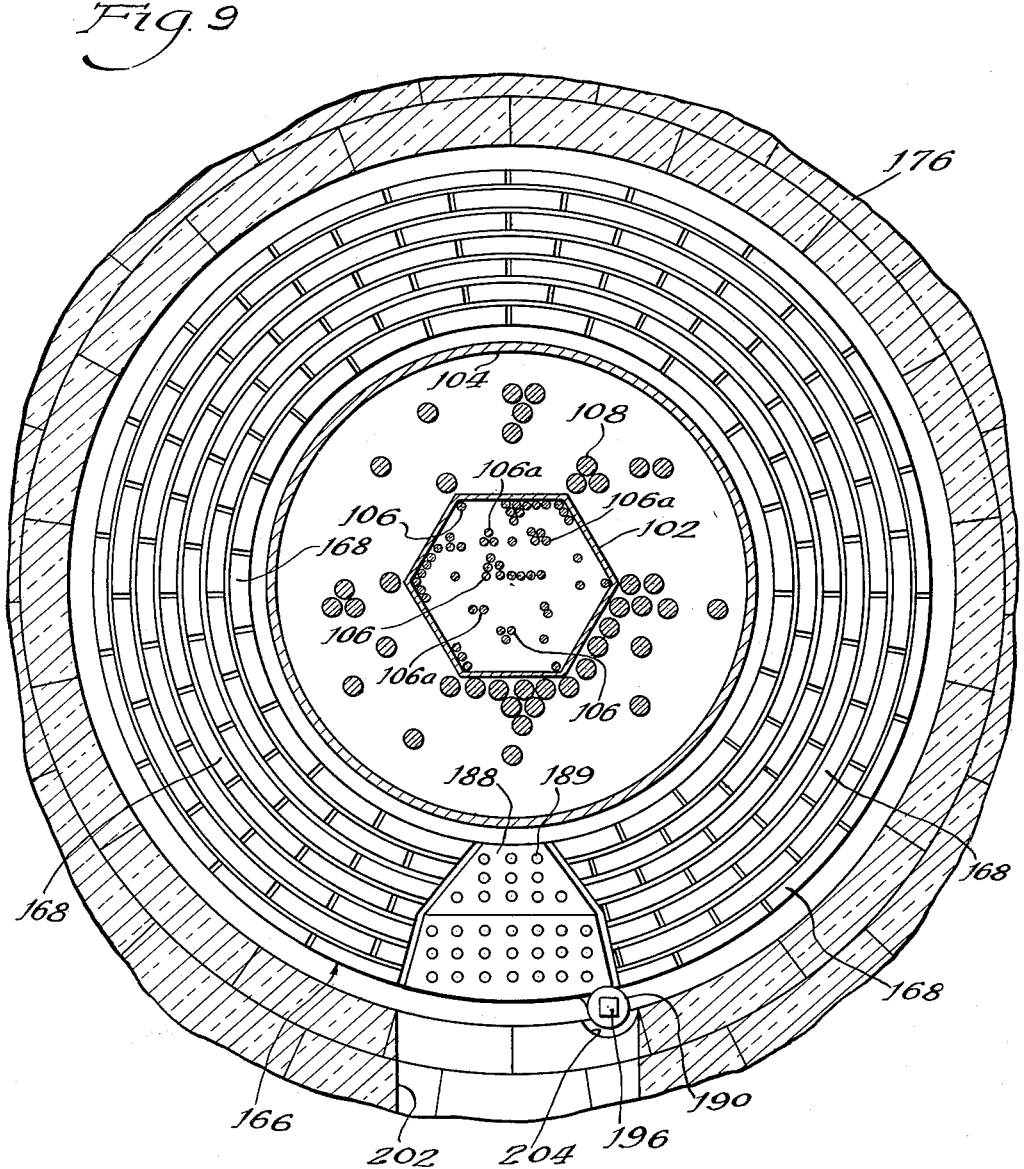

Sept. 10, 1963 L. SZILARD 3,103,475
REACTOR
Filed Sept. 20, 1946 13 Sheets-Sheet 11

Witness:
Walter T. Schlegel, Jr.

INVENTOR.
Leo Szilard
BY
Robert A. [Attorney signature]
Attorney

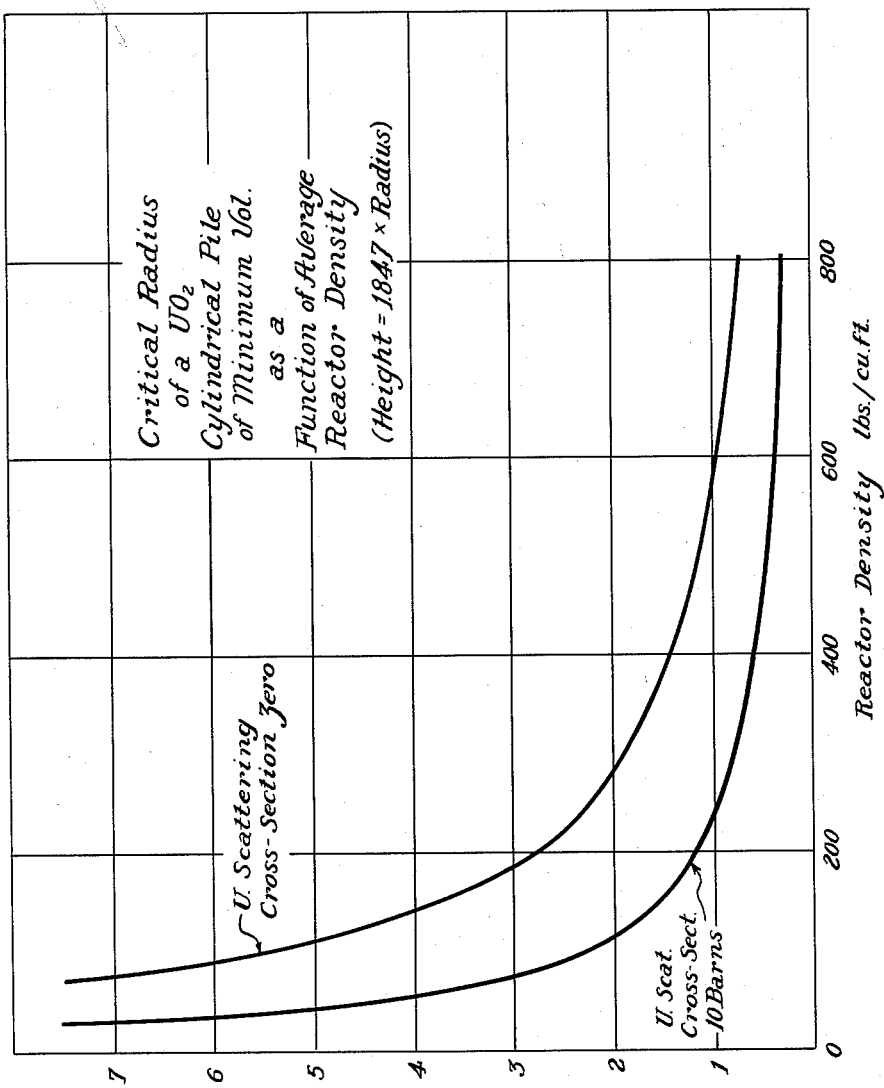

Sept. 10, 1963     L. SZILARD     3,103,475
REACTOR
Filed Sept. 20, 1946     13 Sheets-Sheet 13
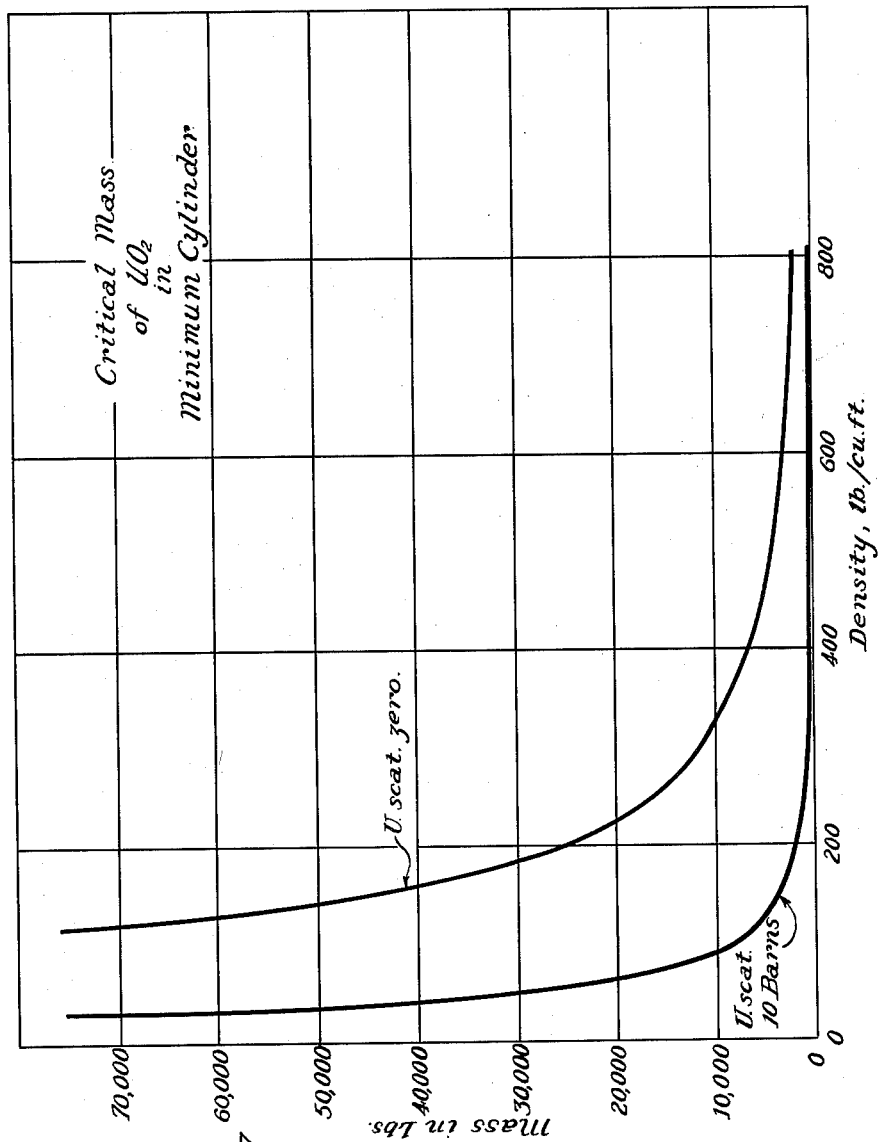
INVENTOR.
Leo Szilard
BY
Robert A. Lavender
Attorney
Witness:
Walter L. Schlegel, Jr.

United States Patent Office 3,103,475
Patented Sept. 10, 1963

3,103,475
REACTOR
Leo Szilard, Chicago, Ill., assignor to the United States of America as represented by the United States Atomic Energy Commission
Filed Sept. 20, 1946, Ser. No. 698,334
3 Claims. (Cl. 204—193.2)

This invention relates to nuclear physics and more particularly to a novel method and means for establishing and controlling a fast neutron nuclear fission chain reaction.

It is known in the art that a controlled slow neutron chain reaction may be established by combining fissionable material and neutron moderator to form a reactive mass, the moderator being effective to reduce the average neutron energy to a value at which the fission cross section of said material is relatively great.

In slow neutron reactors a neutron fissionable isotope such as $U^{233}$, $U^{235}$, or $Pu^{239}$ or mixtures thereof is subjected to fission by absorption of neutrons and a self-sustaining chain reaction is established by the neutrons evolved by the fission. In general, such reactors comprise bodies of compositions containing fissionable material such, for example, as natural uranium, disposed in a neutron slowing material which slows the neutrons to thermal energies. Such a slowing material is termed a neutron moderator. Carbon and $D_2O$ (heavy water) are typical moderators suitable for such use. Heat is evolved during the reaction which is removed by passage of a coolant through the reactor or in heat exchange relationship therewith. Specific details of the theory and essential characteristics of such reactors are set forth in U.S. Patent 2,708,656 of Enrico Fermi and Leo Szilard, Serial No. 568,904, filed December 19, 1944.

In reactors of the above-described type a substantial portion of neutrons is lost to the chain reaction by absorption in nonfissionable material and by absorption in fissionable material without fission thereof. Consequently the amount of nonfissionable material in the reactor must be carefully limited. This practice has been disadvantageous, inasmuch as it has required limitation of the amount of coolant, the number of cooling conduits, and the quantity of other neutron absorbent structural components, thereby imposing limitations upon the power output of the reactor and upon the structural quality thereof. Moreover, the use of nonfissionable neutron absorbent coolants and other neutron absorbent equipment within the reactor has resulted in a serious loss of neutrons which might otherwise have been available for effecting further fissions or producing fissionable isotopes from nonfissionable isotopes, as hereinafter discussed.

In accordance with the present invention it has been found that neutron absorption losses may be greatly minimized by establishing and maintaining a self-sustaining nuclear fission chain reaction while avoiding the slowing of evolved neutrons below an average energy of about 1,000 ev., and preferably below about 10,000 ev. At such high energies, it has been discovered that the elements of atomic number of 11 to 83, which are generally used as structural, cooling, or other elements in a reactor, have neutron absorption cross sections which are substantially lower than their absorption cross sections for neutrons at thermal energies. In contrast, the absorption cross section for neutrons at high energies of certain heavy isotopes, such as $Th^{232}$ or $U^{238}$, which are converted to thermally fissionable isotopes upon neutron bombardment, are not so greatly reduced; and hence their tendency for neutron absorption is correspondingly higher than for lower atomic number elements. Thus, a substantial saving of neutrons may be effected by maintenance of the high energy level.

Similar advantages may accrue by operating neutronic reactors at lower energies, as for example, as low as 10 ev. or even as low as 0.3 ev., which energies are substantially above the energy of thermal neutrons at room temperature, that is about 0.03 ev. However, the higher energizes of 1,000 ev. and above are preferred, inasmuch as nonmoderating neutron reflectors may be utilized with reactors operating at these values. For example, as hereinafter discussed in detail, the isotopes $U^{238}$ and $Th^{232}$ may be utilized for this purpose, particularly in view of the fact that whatever neutron absorption occurs in these isotopes results in the production of thermally fissionable isotopes, as for example, $94^{239}$ from $U^{238}$ and $U^{233}$ from $Th^{232}$.

In neutronic reactors, the ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently, a system of finite size may be said to have a K constant, even though the value thereof would only exist if the system as built were extended to infinity without change of geometry or materials. Thus, when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size, therefore, differs from K by the external leakage factor, and by a factor due to the neutron absorption by localized neutron absorber, and the reproduction ratio, R, must still be sufficiently greater than unity to permit the neutron density to rise exponentially with time in the system as built.

During the interchange of neutrons in a neutron-moderated system of finite size, comprising bodies of any size disposed in a neutron moderator, neutrons may be lost to the chain reaction in four ways: by absorption or capture in the uranium content of the bodies without producing fission; by absorption or capture in the moderator material; by absorption or capture by the impurities present in both the uranium bodies and the moderator; and by leakage out of the system through the periphery thereof. In a fast reactor all of these losses, except the last, are either substantially eliminated or are greatly reduced.

It has been discovered that stabilization of a fast neutron chain reaction is possible in view of the fact that a potentially chain reacting mass of this type has two definite critical dimensions, a smaller one at which the total neutron emission, including the delayed neutron emission, is capable of sustaining a reaction, and a larger critical dimension at which the instantaneous neutron emission alone is sufficient to sustain a chain reaction. If the chain reacting mass or reactor is operated at a size slightly greater than the smaller of these two values and considerably smaller than the larger of these two values (neutron reproduction ratio greater than 1.0 but not above about 1.01 or 1 plus the fraction of neutrons evolved which are delayed neutrons), the intensity of the chain reaction rises exponentially with time at a rate which is practically independent of the life time of the fast neutrons in the chain reacting mass and is determined by the time constant of the delayed neutron emission. Thus, according to the present invention, a fast neutron chain reaction may be controlled within the delayed neutron range, just as a slow neutron reactor is controlled, as is more fully discussed in the previously mentioned copending application. However, special means for effecting such control may be provided as hereinafter set forth.

Several advantages accrue from the operation of a neutronic reactor at high neutron energy values. For example, the poisoning effect of impurities or poisons, such as xenon$^{135}$, formed within the reactor as fission products are eliminated, thus eliminating the necessity of building excess reactivity into the reactor to accommodate compensation for such poisons by the removal of shims during the reaction, as more fully discussed in the above-mentioned copending application.

Another advantage of fast neutron reactors is their small size and compactness resulting from the substantial elimination of neutron moderator, and also the elimination of substantial neutron losses due to absorption by the coolant and other impurities, as previously discussed. It may be noted in this connection that by decreasing neutron absorption in the coolant, the handling of the coolant and of the associated circulating apparatus is simplified; and serious hazards to operating personnel, who may come into contact with the coolant and the associated circulating apparatus, are substantially reduced.

Another advantage of a fast neutron reactor is an increase in the available number of neutrons per fission in the reactor. It has been found that such an increase is attained in a fast neutron reactor such as above-described, wherein the fissionable material is Pu$^{239}$, and it is believed that the increase is due to the fact that the average neutron energy is greater than 0.3 ev., at which energy maximum resonance absorption occurs in this isotope without fissioning thereof and also may be due to the fact that more neutrons appear to be emitted on the average for each fission of a Pu$^{239}$ atom by a fast neutron than by a slow neutron.

It will be understood that the above features simplify the construction of a so-called "breeder" system, wherein a chain reaction is utilized to produce fissionable material at a rate greater than the rate of consumption of fissionable material within the chain reacting composition. This is accomplished by neturon bombardment of "fertile" material adapted to undergo nuclear reaction productive of fissionable material, as hereinafter discussed. In this connection it has been found that neutron losses in a slow neutron reactor utilized in a breeder system are frequently so great as to reduce the rate of production of fissionable material to a value lower than that at which fissionable material is consumed, thereby preventing the use of such a system for the breeding of fissionable material.

A general object of the invention is, therefore, to establish and control a fast neutron chain reaction wherein little or no neutron moderator is provided to slow down the neturons which take part in the chain reaction. A preferred embodiment of the novel system, as above-noted, operates at an average neutron energy above 1,000 ev. and preferably within or above the range from 10,000 ev. to 100,000 ev. If desired, an average neutron energy substantially above thermal energies (at least 0.3 ev.) may be maintained with beneficial results, as above discussed.

Another object of the invention is to establish a controllable fast neutron chain reaction by so designing the reactive composition that the total neutron emission therein, including delayed neutrons, is sufficient to sustain a chain reaction, the instantaneous neutron emission alone being insufficient to sustain a chain reaction.

Still another object of the invention is to provide a novel method and means for controlling a fast neutron chain reaction by introducing neutron moderator into the reactive composition and withdrawing said moderator therefrom to regulate the neutron reproduction ratio of the composition, as hereinafter more fully described.

A further object of the invention is to provide a novel method and means for breeding fissionable material or other desired isotopes by utilizing the neutrons from a fast neutron chain reaction to bombard isotopes capable of undergoing nuclear reaction productive of thermally fissionable material.

The foregoing and other objects and advantages of the invention will become apparent from a consideration of the following specification and the accompanying drawings, wherein:

FIG. 1 is a diagrammatic illustration of a fast neutron reactor embodying the invention, portions of the structure being shown in central vertical cross section and other portions being shown in side elevation;

FIG. 2 is a cross sectional view taken on the line 2—2 of FIG. 1;

FIG. 3 is an enlarged vertical sectional view through one of the reactive rods shown in FIGS. 1 and 2;

Figure 12:
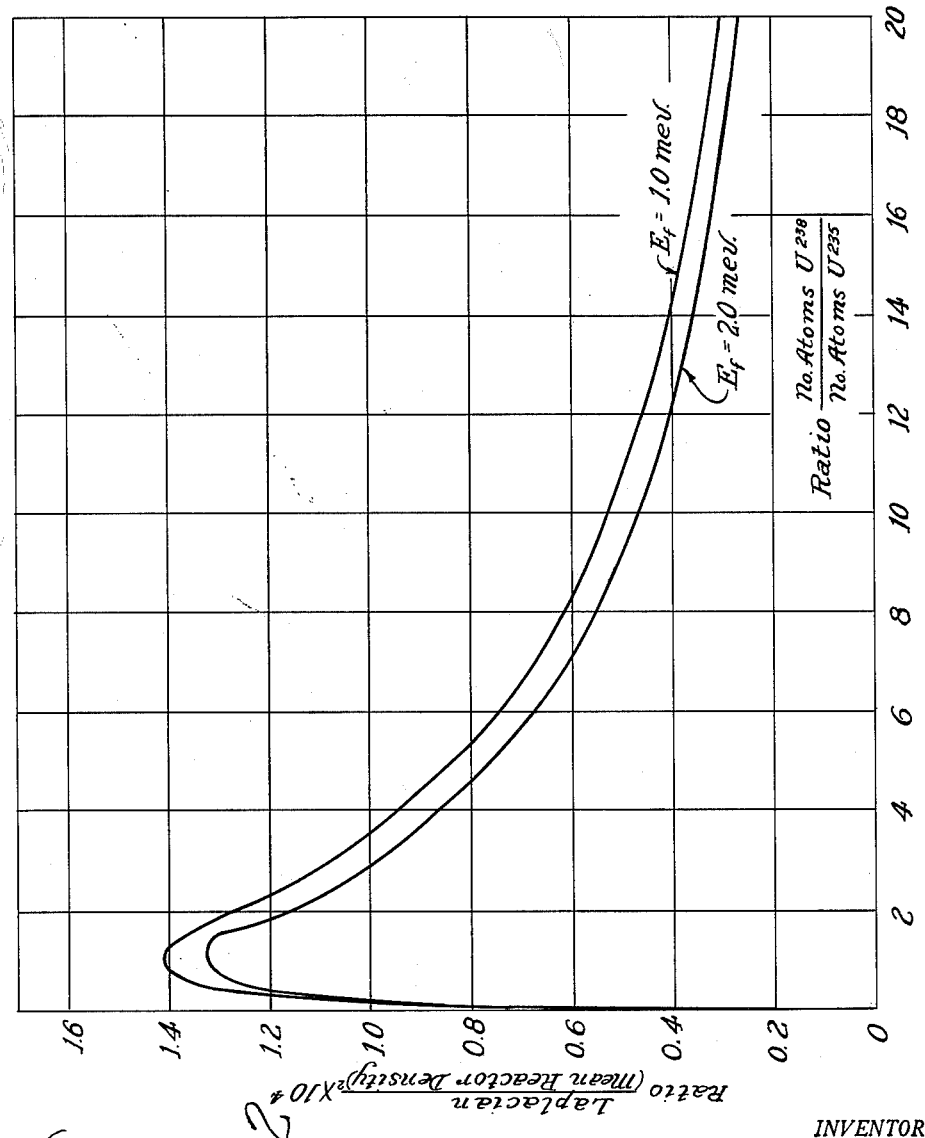

FIGS. 4 and 5 illustrate another embodiment of the invention, FIG. 4 being a fragmentary vertical sectional view partly in elevation of a reactor similar to that shown in FIGS. 1 and 2; and FIG. 5 being a sectional view taken on the line 5—5 of FIG. 4;

FIG. 6 is a side view of another embodiment of the invention, portions of this view being shown in vertical section and other portions being shown in side elevation;

FIG. 7 is a fragmentary side elevation taken from the left as seen in FIG. 6, portions of the structure being shown in vertical section;

FIG. 8 is an enlarged view of a portion of FIG. 7;

FIG. 9 is an enlarged cross sectional view taken on the line 7—7 of FIG. 6; and

FIGS. 10 and 11 are fragmentary vertical sectional views illustrating, respectively, a reactive rod and a reflector rod shown in FIGS. 6 and 9;

FIGS. 12 to 17 inclusive are graphs representing calculations which may be utilized in the construction of fast neutron reactors without neutron reflectors. Values of the Laplacian indicated in these figures are negative values.

Describing the invention in detail and referring first to FIGS. 1 and 2, the embodiment of the invention illustrated therein comprises a reactor generally designated 2 in the form of a plurality of reactive or fissionable rods 4, the composition and construction of which are hereinafter discussed. The rods, only a few of which are shown, are disposed within a cylindrical tank or container 6 preferably formed of steel and provided with top and bottom inlet and outlet conduits 8 and 10 (FIG. 1), respectively, adapted to convey a coolant, such as helium or a liquid metal such as liquid sodium, liquid sodium potassium alloys or other suitable substance having an atomic number above 10, which is relatively ineffective to moderate neutrons within the reactor.

The rods 4 are supported by a steel plate 12 which is seated on ribs 14, carried by the bottom wall of the tank 6. The plate 12 also abuts the bottom edge of a steel liner 16 and comprises one or more openings or ports 18 communicating with passages 20 in said liner to accommodate flow of the coolant from the tank 6 into the before-mentioned outlet conduit 10. The upper ends of the rods 4 are supported by a steel plate 22 mounted on steel pedestals or columns 24 carried by the plate 12. One of the rods 4 is shown in detail in FIG. 3 and comprises a cylindrical member 26 containing thermally fissionable material enclosed within a thin walled steel tube or sheath 28 closed at its ends by plugs or caps 30 and 32, respectively, the cap 32 being integrally formed with a steel pin 34 and the cap 30 being provided with a socket for the reception of a steel pin 36; said pins being adapted for engagement with complementary openings in the plates 12 and 22, as best seen in FIG. 1.

The rods 4, as hereinafter discussed in detail, contain sufficient thermally fissionable material to sustain a fast neutron chain reaction. Preferably, the rods 4 contain one or more isotopes herein called "fertile" isotopes or material, which are fissionable by fast neutrons and are substantially nonfissionable by slow neutrons, and which absorb or capture neutrons, fast or slow, to undergo nuclear reaction productive of fissionable material, as for example, the isotopes $Th^{232}$ and $U^{238}$, which are converted to $U^{233}$ and $Pu^{239}$, respectively, by nuclear reaction under neutron bombardment. The rods also initially contain one or more isotopes fissionable by slow or fast neutrons, such as fissionable $U^{233}$, $U^{235}$, or $Pu^{239}$ or other isotopes, herein called "thermally" fissionable isotopes or material, inasmuch as they are fissionable by thermal neutrons which are neutrons having velocities of about 2,200 meters per second. Such thermally fissionable isotopes or materials are also fissionable with higher energy neutrons. Preferably, the fertile material and the thermally fissionable material are so proportioned and disposed that thermally fissionable material is produced during the reaction at a rate greater than that at which said thermally fissionable material is consumed or fissioned, so that the system above-described is a "breeder" system.

For example, assuming that the rods 4 are formed of an alloy of $U^{238}$ and $Pu^{239}$, about 3 neutrons are emitted on the average for each fission of a $Pu^{239}$ atom under the action of a fast neutron. Of these neutrons, one is needed to sustain the chain reaction, and a fraction of a neutron, on the average, is lost to the system as above-described. The remaining neutrons are captured by the $U^{238}$ atoms or cause fission thereof, resulting in about 2.3 neutrons on the average for each fission. By eliminating neutron moderator, a relatively great number of neutrons in the system are above the fission threshold (900,000 ev.) of $U^{238}$, and thus by fissioning the same increase the amount of neutrons available for the production of $Pu^{239}$ by absorption in $U^{238}$.

In this embodiment the chain reaction may be controlled by various methods such as by introducing into the chain reacting mass or reactor 2 at the center or core thereof a quantity of liquid, such as molten lead or a lead bismuth alloy capable of slowing the neutrons to a limited extent. The core of the reactor 2 is generally designated as the portion constituting about one-eighth thereof closest to its center, where the neutron density is normally greatest. Thus, the reactor can be controlled by varying the amount of neutron slowing liquid in the core up to about one-fifth of the mass thereof. The neutron slowing liquid is carried by steel tubes 38 connected to inlet and outlet lines 40 and 42. The inlet line 40 is connected to a discharge side of a pump 44, the suction side of which is connected to a tank or sump 46 containing the moderating liquid, which is maintained at a predetermined minimum temperature value by any suitable means (not shown). The tank 46 is also connected to the outlet line 42.

The inlet line 40 is connected to a by-pass line 48, which is connected to the inlet side of a conventional heat exchanger 50, the outlet side of which is connected to the suction side of the pump by a line 51. Thus, a portion of the neutron slowing liquid is constantly reduced to a minimum temperature value within the heat exchanger 50 and is passed through the pump during operation thereof to prevent excessive heating thereof due to heat absorbed in the moderating liquid within the reactor 2.

The preferred method of controlling the chain reaction is to construct the chain reactor to a size slightly smaller than the critical size with the tubes 38 substantially empty. Then as the moderator liquid is pumped into the tubes 38, the reproduction ratio of the reactor is increased to a value above unity inasmuch as the fission cross section of the thermally fissionable material is generally inversely proportional to the energy of the neutrons within the reactor.

In such an arrangement, the rods may be spaced to provide any desirable volume ratio between the coolant and the thermally fissionable material where a coolant such as bismuth is utilized which is capable of moderating neutrons to a limited extent. Thus the average neutron energy may be maintained at any desired value above about 0.3 ev. and preferably above 1000 ev.

It may be noted that experiments have shown that the average number of neutrons emitted per fission of a $U^{238}$ atom in fast neutron reactors is about 1.2 in a composition composed principally of $Pu^{239}$ and $U^{238}$. Furthermore, $U^{238}$ undergoes an $n, 2n$ reaction which may afford a 2½ percent increase in the number of neutrons produced within the reaction zone. This $n, 2n$ reaction produces 93 $Np^{237}$ as follows:

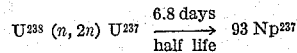

$$U^{238}\ (n, 2n)\ U^{237} \xrightarrow[\text{half life}]{\text{6.8 days}} 93\ Np^{237}$$

Inasmuch as $93^{237}$ is fissionable with a fission cross section which has been measured as $0.018 \pm 0.005$ barns for thermal neutrons, this isotope may participate to some extent in the chain reaction.

A number of neutrons in the nuclear fission chain reaction are absorbed by $Pu^{239}$ atoms to produce $Pu^{240}$, an isotope which has not yet been measured with respect to its fission cross section. However, assuming that this isotope is not fissionable, the production thereof is generally inversely proportional to the average neutron energy in the reactor, inasmuch as the absorption (without fission) cross section of $Pu^{239}$ decreases to a greater extent than the fission cross section thereof as the average neutron energy increases. For this reason, the production ratio of $Pu^{240}$ can be counted upon to decrease by a factor of about 3 as the average neutron energy is increased from thermal energies to about 1 mev. Thus, in a mixture of $Pu^{239}$ and $U^{238}$, at least about 2.5 neutrons on the average are emitted per fission of a $Pu^{239}$ atom. This figure may be multiplied by 1.2, the average number of neutrons emitted per fission of a $U^{238}$ atom, thus giving a value of about 3 neutrons emitted per thermally fissionable atom destroyed, thereby making possible a gain of about one thermally fissionable atom per similar atom destroyed. It may be noted, however, that according to certain experiments about 3 neutrons are emitted on the average for each fission of a $Pu^{239}$ atom, a value which would afford an even greater breeding gain of thermally fissionable material.

FIG. 12 comprises a plot of the ratio of the Laplacian ($\Delta$) to the square of the mean density of the reactor as a function of the concentration of $U^{235}$ in a reactive metal composition comprising $U^{238}$ and $U^{235}$ in a pile or reactor such as that shown in FIGS. 1 to 3, the density being defined as the weight of the designated material per unit volume of the chain reacting zone. Two curves are plotted, one for an assumed mean neutron fission energy of 1.0 mev., and the other for an assumed energy of 2.0 mev. In this connection, it will be understood that the critical size of a pile may be calculated by the following formulae, if the Laplacian is known, as is more fully discussed in the above-mentioned Fermi and Szilard application.

In case the reactor is to be built in the form of a large spherical structure, the critical radius (R) is given by $$R = \frac{\pi}{\sqrt{-\Delta}}$$

In case the structure is to be a rectangular parallelopiped with sides $a_1$, $a_2$ and $a_3$ the critical size is given by the formula $$-\Delta = \frac{\pi^2}{a_1^2} + \frac{\pi^2}{a_2^2} + \frac{\pi^2}{a_3^2}$$

In case the structure is to be built up as a cylinder of height H and radius R, the critical values of these quantities may be computed from the formula $$-\Delta = \frac{\pi^2}{H^2} + \frac{(2.405)^2}{R^2}$$

It is noted that in FIG. 12, the $$\text{Ratio}\left(\frac{\text{Laplacian}}{\text{mean metal density}^2} \times 10^4\right)$$

is plotted along the ordinate of the graph, and the ratio of $U^{238}$ atoms to $U^{235}$ atoms is plotted along the abscissa of the graph. According to this graph, the Laplacian becomes very low for zero amounts of $U^{238}$, a phenomenon which is probably due to the neutron reflecting or scattering effect of $U^{238}$, which moderates neutrons to a limited extent by inelastic collision therewith, thus reducing the average neutron energy and consequently increasing the fission cross section of $U^{235}$.

Figure 13:
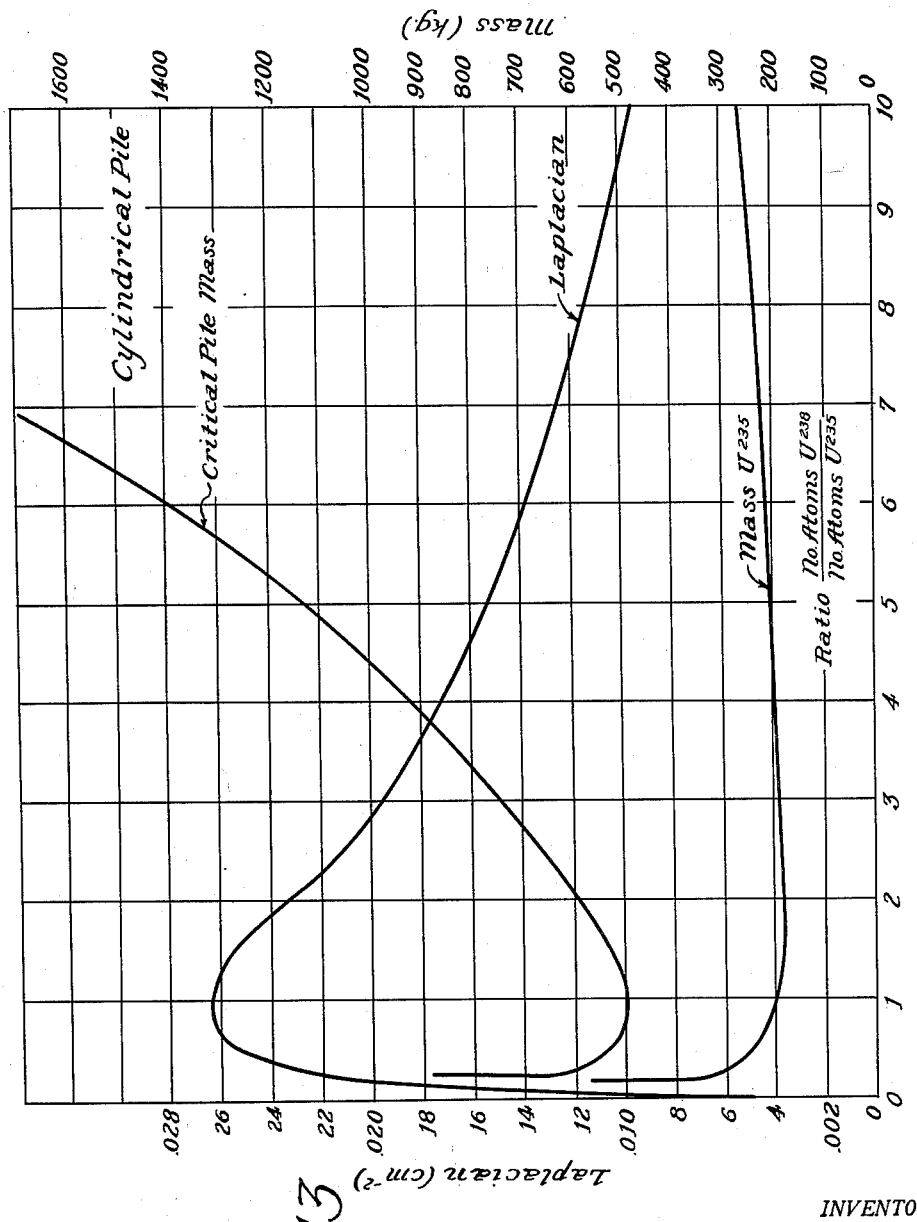

Referring now to the graph of FIG. 13, there are shown two curves indicating respectively critical pile mass in kilograms and critical mass in kilograms of $U^{235}$ for a minimum cylindrical pile i.e., one in which H is equal to 1.847R, such as that shown in FIGS. 1 to 3, and another curve indicating the Laplacian for a pile of any contour, the mean pile density being assumed to be 14.2 grams per cubic centimeter in the derivation of all three curves. All of the curves shown in FIG. 13 are derived from the lower curve of FIG. 12, for which the average neutron energy, $E_f$, is equal to 2 mev. For example, according to this graph, assuming that the ratio of $U^{238}$ atoms to $U^{235}$ atoms in metallic state is 1 to 1, approximately 250 kilograms of $U^{235}$ metal would be required in a cylindrical pile with a critical mass of 500 kilograms, assuming that the pile is composed solely of $U^{238}$ and $U^{235}$ metal with the above-mentioned reactor density. The Laplacian of such a pile is 0.0264. In order for a pile of this type (FIGS. 1 to 3) to breed, the concentration of $U^{235}$ is preferably not greater than about 1 atom of $U^{235}$ to 1.9 atoms of $U^{238}$, although this depends materially upon the mean energy of the neutrons, as above discussed.

Figure 14:
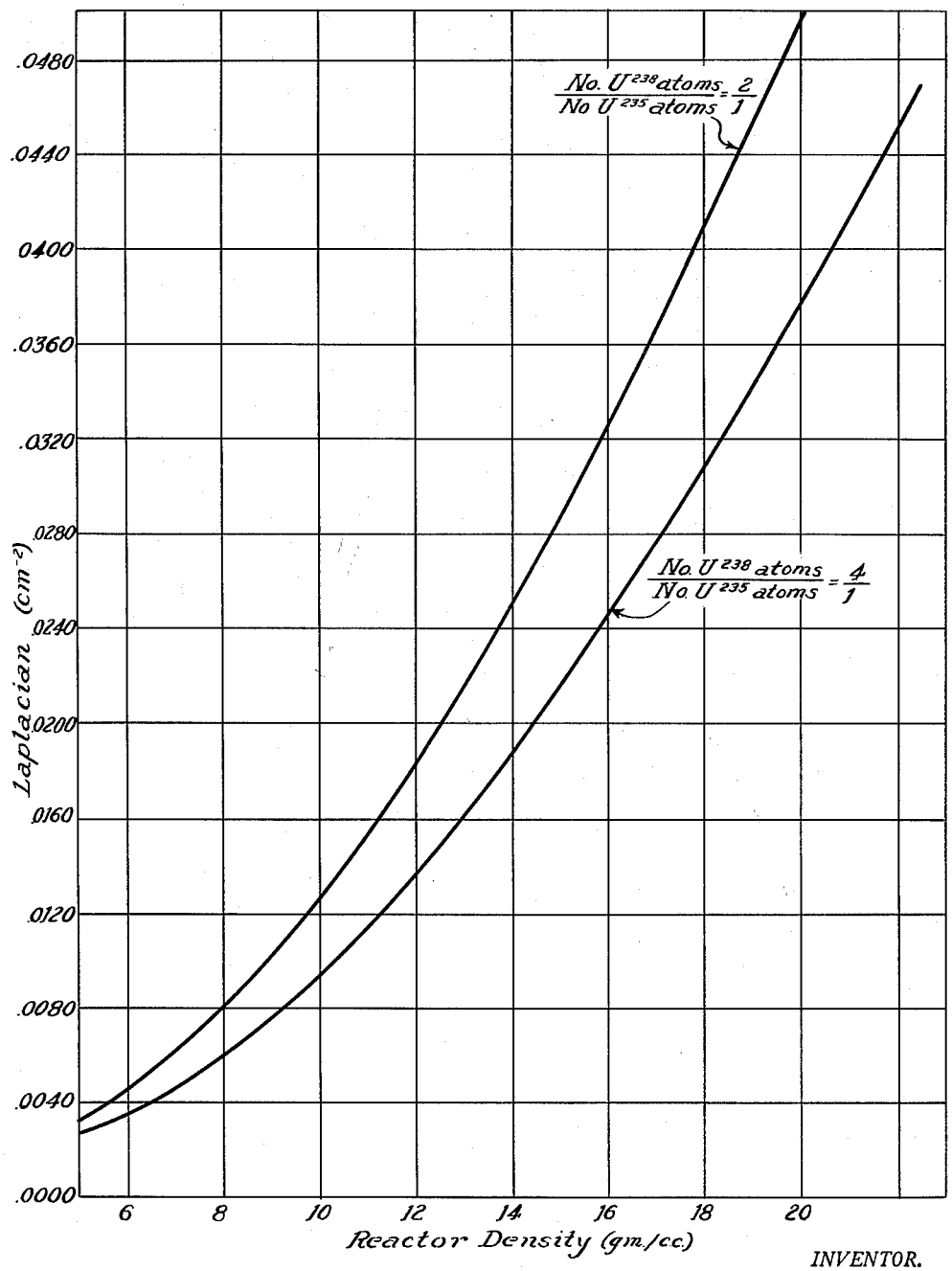

FIG. 14 shows the effect upon the Laplacian of changes in reactor density of a fast neutron pile for a 20 percent concentration of $U^{235}$ and 33⅓ percent concentration thereof. The two curves shown in FIG. 14 are both derived from the upper curve of FIG. 12, for which the average neutron energy, $E_f$, is equal to 1 mev.

Figure 15:
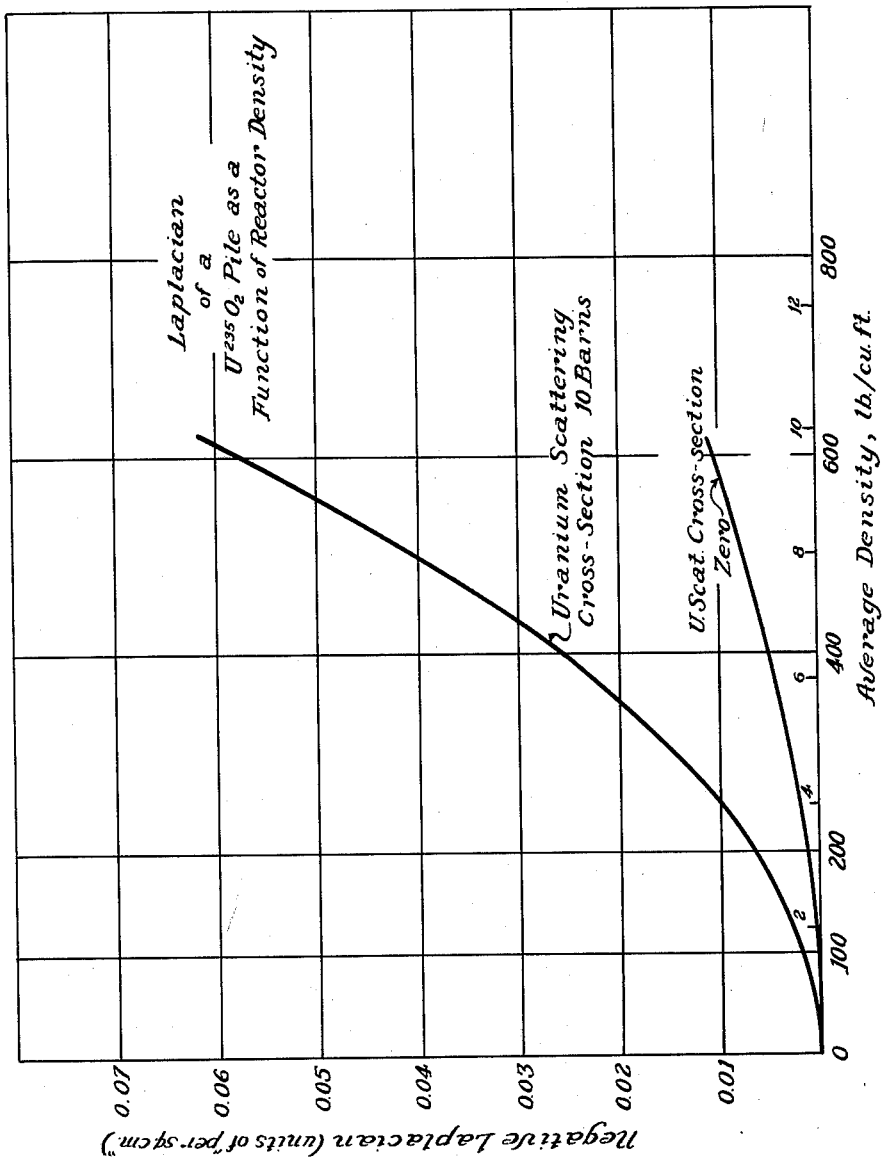

Referring now to FIG. 15 the Laplacian of a $U^{235}O_2$ fast neutron pile is plotted as a function of the reactor density. The curve at the left of this figure is based on an assumed uranium scattering cross-section of 10 barns (1 barn = $10^{-24}$ cm.$^2$), and the curve at the lower part of this figure is based on an assumed uranium scattering cross section of zero. It will be understood that in actual practice, reactors will fall within the area between these two curves. Thus if the average amount of $UO_2$ in the reactor is 400 pounds per cubic foot of the reactor, the Laplacian will fall between 0.005 and 0.025.

Referring now to FIG. 16, the critical radius of a $U^{235}O_2$ cylindrical pile is plotted as a function of the average reactor density, the height of the pile being 1.847 times the radius. In this graph, as in the graph of FIG. 13, two curves are shown based respectively on a uranium scattering cross section of 10 barns, and a uranian scattering cross section of zero. Thus assuming a reactive zone wherein the reactor has an average density of approximately 200 pounds per cubic foot, the critical radius of such a reactor would be between about 1.25 feet, and about 2.75 feet depending upon the actual scattering cross section of the uranium. If on the other hand, the density of the uranium oxide were about 450 pounds per cubic foot, the critical radius would be between 0.5 feet and 1.25 feet depending upon the actual scattering cross section of the uranium.

FIG. 17 is a graph illustrating the critical mass of $UO_2$ in a minimum cylinder, two curves being illustrated based respectively on a uranium scattering cross section of 10 barns and a uranium scattering cross section of zero. Thus, for example, if the concentration of uranium oxide in the reactor is about 200 pounds per cubic foot of the reactor, the critical mass of the reactor would be between 2,500 pounds and 25,000 pounds depending upon the actual scattering cross section of uranium.

The embodiment shown in FIGS. 4 and 5 comprises a reaction tank 54 with coolant inlet and outlet conduits 56 and 58 as in the previously described embodiment. The tank 54 contains a stainless steel liner 59 substantially identical with that shown in FIG. 1. A steel tube or conduit 60 extends through the tank 54 and through the inlet and outlet conduits 56 and 58 to accommodate flow of a neutron absorbing or moderating fluid, such as mercury or liquid bismuth for the purpose of controlling the reaction, as discussed in connection with FIGS. 1 to 3.

The reactor shown in FIGS. 4 and 5 comprises a plurality of fixed neutronically pure uranium rods 61 supported by top and bottom plates or walls 62 and 64 as in the previously described embodiment, the rods within the area indicated at X (FIG. 5) being initially enriched with a thermally fissionable isotope, such as $Pu^{239}$.

A plurality of pairs of rotatable support plates 66 and 68 are disposed within the tank 54, the bottom plates 68 being rotatably supported from the before-mentioned wall 64, and the top plates 66 being connected to actuating rods 70 for rotation thereby. Connected between each pair of plates 66 and 68 are a plurality of neutronically pure uranium rods 72 constituting a rotatable bundle or group of rods participating in the nuclear fission chain reaction. In this arrangement, the rods 72 disposed within the area X are initially enriched with a thermally fissionable isotope. As the fast neutron chain reaction breeds additional thermally fissionable material in the various rods 61 and 72 thus increasing the neutron reproduction ratio of the system, the bundles of rods 72 are rotated to bring the unenriched rods 72 into the area X which is the core of the reactor at which the neutron density is greatest. Thus, the natural uranium rods 72 which are initially disposed externally of the area X are gradually moved into this area to be rapidly enriched in thermally fissionable material by conversion of the $U^{238}$ atoms under intense neutron bombardment to $Pu^{239}$ atoms, and at the same time the tendency of the neutron reproduction ratio to rise is temporarily checked or controlled as the natural uranium rods 72 are moved into the area X, until all of the natural uranium rods 72 have been enriched, at which time the reactor may be disassembled for the purpose of recovering the thermally fissionable material produced as above described.

In the arrangement disclosed in FIGS. 4 and 5, the enriched core or central area X of the reactor may be from about one-half to one meter in diameter and approximately of equal height. The coolant circulating through the tank 54 by means of inlet and outlet conduits 56 and 58 is preferably a molten bismuth-lead alloy which occupies an area within the tank 54 equal to about one-third of the enriched core X, said alloy passing through the reactor at a velocity of about 15 meters per second. The reactive rods 61 and 72 are preferably about one-half centimeter in diameter, operating at a temperature of about 700° C. at the center of the central rods, thus accommodating a temperature increase of about 150° C. in the coolant. Under these conditions about 250,000 kw. will be removed from the reactor.

Referring now to FIG. 6, the system shown therein comprises inner and outer steel tanks 102 and 104, the inner tank containing a plurality of composite rods 106 and the outer tank containing a plurality of composite rods 108, all of said rods being supported, as hereinafter described in detail, from a biological shield 110 composed of any suitable material adapted to absorb biologically harmful emanations, such as neutron and alpha, beta, and gamma rays.

The shield 110 is supported by fingers 112 connected to I beams 114 as by bolts 116. The beams are mounted within a biological shield 118 with a central opening 120 accommodating the before-mentioned shield 110. The top of the opening 120 is closed by a cover plate 122, which may be removed to accommodate assembly and disassembly of the rods 106 and 108.

One of the rods 106 is shown in detail in FIG. 10 and comprises a cylindrical segment 124 composed of thermally fissionable material disposed between cylindrical segments 126 and 128 composed principally of fertile material. The segment 124 is connected to the segments 126 and 128 by steel couplings 130 and 132, respectively, the coupling 130 being provided with spaced fins 131 adapted to center the rod 106 in an opening through a wall or partition 134 within the tank 102. The segment 126 is connected to a cylindrical beryllium segment 136 by a coupling 138 formed with fins 140 adapted to center the rod 106 in an opening within a wall 142 of the tank 102. The beryllium segment 136 is connected to an iron segment 144, which is, in turn, connected to another beryllium segment 146. All of the segments are closed within thin walled tubes or sheaths 148 adapted to space the segments from a coolant circulated through the system, as hereinafter described, for the purpose of absorbing the heat of the nuclear fission chain reaction.

The rod 106 is supported from the shield 110 by a spring 150 bearing against a cap 152 connected by a pin or spindle 154 to the top beryllium segment 146, said spring being seated against a spring plate 158 bearing against the top of the shield 110. The cap carries a sleeve 160 enclosing the spring 150, which functions to place the rod 106 under tension, inasmuch as the bottom thereof is interlocked with the bottom wall 162 of the tank 102. Thus, any tendency of the rod to warp due to the heat of the reaction is resisted by the tension on the rod.

The rods 106 are spaced apart .046 inch at their closest portions and are disposed about .494 inch apart, center to center. The diameter of each segment is about .394 inch, and the outside diameter of the jacketed segment is about .448 inch. One-hundred and sixty nine active rods 106 may be utilized in an arrangement wherein the thermally fissionable material is substantially pure $U^{235}$. The inner tank 102, which is hexagonal is shown in FIG. 9, and is about 6.688 inches in width between parallel sides thereof.

One of the rods 108 is shown in detail in FIG. 11 and is substantially identical with the rod 106, except for the larger diameter of the rod 108 and the elimination of the thermally fissionable segment 124. The portions of the rod 108 (FIG. 11) corresponding to those of the rod 106 (FIG. 10) are identified by corresponding numerals, and it will be seen that the bottom segment 128 of the rod 108 containing fertile material is longer than the corresponding segment 128 of the rod 106 because of the elimination of the thermally fissionable segment 124 from the rod 108. The rods 108, as above-noted, are contained within the tank 104 which has an inner diameter of about 15.875 inches. The rods 108 are preferably about .875 inch in diameter and they are spaced apart about .916 inch center to center, thus providing a space of about .041 inch between the closest portions of adjacent rods. The jackets 148 of the rods 108 as well as the rods 106 have a wall thickness of .027 inch. In the instant embodiment of the invention one-hundred and ninety-two rods 108 are utilized.

The rods 106 and 108 are cooled by any suitable coolant such as molten bismuth or a sodium potassium alloy containing, for example, 50 percent by weight of sodium and 50 percent by weight of potassium circulated, as indicated by the arrows in FIG. 6, by inlet and outlet conduits 109 and 111. The inlet conduit is connected to the outer tank 104 and the coolant flows downwardly therethrough into the tank 102 through ports at the bottom thereof and upwardly therethrough into the outlet conduit 111. Thus, the coolant absorbs the heat of the nuclear fission chain reaction, and the energy in the form of heat carried from the reactor by the coolant may be utilized for power or other purposes, if desired.

Referring again to FIG. 6, it will be seen that the thermally fissionable segments 124 of the rods 106 constitute a reactive portion indicated at A, wherein the nuclear chain reaction is sustained, said reactive portion being entirely surrounded by fertile material within the rods 106 and 108. This blanket of fertile material surrounding the reactor A not only absorbs neutrons to produce thermally fissionable material, as above discussed, but also functions as a fast neutron reflector, which reflects or scatters fast neutrons escaping from the reactor A by inelastic collision with the atoms of fertile material, thus reflecting the escaping neutrons back into the reactor to diminish neutron losses from the periphery thereof, thereby decreasing the critical size at which said reactor is capable of sustaining a chain reaction.

The reflector defined by the fertile material in the rods 106 and 108 is surrounded, except for the top thereof, by an outer reflector 166 (FIG. 6) composed principally of fertile material, as for example, bricks or blocks 168 of natural uranium, preferably of high neutronic purity, the principal component of which is $U^{238}$. The blocks 168 are arranged in annular rows or series spaced radially from the longitudinal axis or center line of the tanks 102 and 104, and the blocks of each row or series are spaced apart, as best seen in FIG. 9. Each row of blocks, as best seen in FIGS. 6 and 8, comprises a plurality of horizontal layers, the spaces between the blocks of the respective layers being vertically staggered or misaligned, as seen in FIG. 8. Thus, the reflector 166 is provided with a multiplicity of passages defined by the space between the blocks to afford passage of a reflector coolant such as air or helium under pressure circulated by inlet and outlet conduits 170 and 172. This coolant passes through a reaction chamber 174 containing the tanks 102 and 104 and the reflector 166, said chamber being defined by a neutron moderating reflector or blanket 176 formed, for example, of blocks of graphite or beryllium.

The reflector 166 is formed with a smaller number of the radially spaced rows of blocks 168 at the top and bottom of the reflector than at the center thereof, inasmuch as the neutron density is normally greatest in the reflector at that point. Thus, the blocks 168 are supported by a steel ring 178, the inner surface of which is stepped to accommodate the above-described arrangement of the blocks. The ring 178 is provided with coolant passages 180 and is supported by a biological shield 182 (FIG. 6) mounted on a pneumatic or hydraulic hoist 184, which is, in turn, supported by a pedestal or column 186 adapted to be raised and lowered by any suitable device, such as an hydraulic or screw hoist (not shown) for a purpose hereinafter discussed. The reflector 166 is preferably about five inches thick at its points of maximum thickness and contains about three and one-half tons of uranium.

The nuclear fission chain reaction within the reactor A is normally controlled by a door 188 in the outer reflector 166, said door preferably being principally composed of fertile material, as for example, a block of neutronically pure natural uranium. The door is bevelled on the inner surface thereof, as clearly seen in FIGS. 6 and 9, to define angular paths with the margins of the complementary opening through the reflector 166, thus substantially preventing the escape of neutrons through said opening when the door is in its closed position as is illustrated in the drawings. The door is preferably provided with a plurality of vertical openings 189 (FIG. 9) therethrough to accommodate flow of the before-mentioned reflector coolant, thus preventing the development of excessive heat within the door due to neutron bombardment thereof. Referring to FIG. 8, it will be seen that the blocks 168 comprising the layers immediately above and immediately below the door 188 are preferably replaced by a pair of annular uranium plates 191, provided with openings or perforations 192 adapted to accommodate flow of the reflector coolant therethrough, said plates 191 affording a good structural support for the blocks at the margins of the opening through the reflector 166.

The door is provided with a hub 190 seated on a sleeve or bearing 193 mounted in any convenient manner, as for example, by welding on the ring 178 adjacent the upper edge thereof. A shaft 194 (FIGS. 6 and 7) extends through the bearing 192 and is provided with a square end 196 (FIG. 9) fitted within a complementary opening in the hub 190. The shaft extends downwardly from the bearing 192 through a conventional roller bearing unit 198 mounted on the ring 178, and the shaft is connected at its lower extremity to a motor 200 adapted to rotate the shaft, thus actuating the door to the open and closed positions thereof. The reflector 176 is provided with a recess 202 and a vertical groove 204. The recess 202 is adapted to receive the door as the latter is actuated to its open position, and the groove 204 is adapted to accommodate vertical movement of the hub 190 and bearing 192 during the elevation and lowering of the reflector 166, as hereinafter described.

It has been found that when the door 188 is open, fast neutrons escaping therethrough are scattered through the reaction chamber 174 and are slowed by elastic collision with the atoms of neutron moderator constituting the reflector 176. Thus, the slowed neutrons are unable to penetrate the fertile material constituting the inner and outer reflectors around the reactor A, and are, for the most part, absorbed by this fertile material or by the wall of the outer tank 104. This loss of neutrons reduces the neutron reproduction ratio of the reactor A, and thus by adjusting the door 108, this ratio may be adjusted to values above and below unity, thereby accommodating regulation of the neutron density within the system. It will be understood that while one relatively large door 188 is illustrated in the drawings, if desired, any number of such doors of any suitable size may be utilized for the purpose of regulating the reaction.

Emergency control may be effected with the door 188 closed, by dropping the reflector 166 by means of the hoist 184 or, if desired, emergency control may be achieved by elevating one or more of the reactive rods within the tank 102, said rods being designated at 106a in FIGS. 6 and 9; and being identical with the rods 106, except that they are not secured to the bottom wall of the tank 102. Each rod 106a is provided with a coupling 206 (FIG. 6) at its upper extremity for convenient connection to any conventional actuating mechanism (not shown) supported, for example, by the cover plate 122.

It will be understood that from time to time it is desirable to renew the blocks 168 constituting the outer reflector 166, and this is accomplished by actuating the hoist 184 and the column 186 to lower the reflector 166 into a handling chamber 208, whereupon a biological shield 210 is moved, as for example, by means of wheels 212 through a chamber 214 to a position beneath the reactor A and above the handling chamber 208. Thereafter the reflector 166 may be disassembled for the purpose of recovering the thermally fissionable material formed within the blocks 168, and a new reflector may be assembled on the ring 178 and may be elevated therewith into position around the reactor A, as shown in FIGS. 6 and 7.

Assuming that the thermally fissionable segments 124 are composed of $U^{235}$, the amount required for the above-described reactor is determined by the concentration of this isotope in the segments. If the segments 124 are formed of enriched uranium containing $U^{235}$ in concentration of the order of 90%, the total amount of enriched uranium would be about 45 kilograms containing about 40 kilograms of $U^{235}$. Under certain circumstances wherein it is desirable to raise the number of kilowatts per kilogram of $U^{235}$, it may be desirable to use this material in more dilute form. For example, enriched uranium containing $U^{235}$ in concentration of the order of 35% would sustain a reaction in a device such as above-described if 100 kilograms of $U^{235}$ were provided in the reactor. However, the breeding gain and neutron absorption of the coolant is not materially changed by utilizing $U^{235}$ in greater dilution. It may be noted that a smaller quantity of $Pu^{239}$ in the reactor A would be necessary to sustain a reaction, all other factors being equal, inasmuch as a greater number of neutrons are emitted on the average by $Pu^{239}$ atoms during fissioning thereof than are emitted by $U^{235}$ atoms.

For an estimation of the breeding gain in thermally fissionable material, the geometry of the reactor and the pertinent nuclear constants must be considered. The following are for the above geometry using reasonable values of the nuclear constants based on actual measurements:

*Internal Portion of Reactor*

| Material | Relative Volume of Components | Relative Neutron Absorption |
| --- | --- | --- |
| $U^{235}$ | 1 | 1 |
| Fe | 0.4 | 0.01 |
| Na-K alloy (50% by wgt. of each) | 0.4 | 0.0 |

*Reactor Blanket*

| Material | Relative Volume of Components | Relative Neutron Absorption |
| --- | --- | --- |
| Natural Uranium | 1 | 1 |
| Fe | 0.4 | 0.08 |
| Na-K alloy (50% by wgt. of each) | 0.4 | 0.01 |

In the above tables, are listed in the first column the materials of the reactor and in the second column the relative volumes of these materials in terms of the volume of $U^{235}$ and natural uranium in the first and second tables, respectively. The third column indicates the relative number of neutrons absorbed by the various components. It is to be noted that in the reactor proper the absorption of neutrons due to the iron and due to the sodium potassium in the coolant alloy is negligible compared to the neutrons absorbed by the $U^{235}$. This is not true, however, for the reflector, and it is believed that the numbers given in the table for the fraction of neutrons absorbed in the iron and in the alloy coolant in the reflector are high since these calculations assume that all of the blanket is iron jacketed and cooled by the alloy. As above-described, however, the outer reflector 166 is so designed that neither iron nor cooling metal will be present. The other serious loss of neutrons from the reactor is in the upper direction where channels are provided for removing the rods from the device. It may be noted that by lengthening the segments 126 of these rods sufficiently that the loss in this direction can be held down to that estimated for the other parts of the reflector. For the conditions outlined here the breeding gain, that is, the extra few fissionable atoms formed for those consumed, is estimated to be between 0.15 and 0.2.

More explicitly, this means that for each $U^{235}$ atom consumed between 1.15 and 1.2 new $Pu^{239}$ atoms are generated. It should be pointed out that for most purposes concerning the chain reaction $Pu^{239}$ is considerably more effective or more valuable than $U^{235}$, so that more is gained by this conversion than is indicated by these numbers.

It will be apparent from the discussion of the reactor illustrated in FIGS. 6 and 7 that the reactor comprises a central active area containing a fissionable isotope in concentration sufficient to be capable of sustaining a fast neutron chain reaction, the central area being surrounded by several concentric areas or blankets. The blankets comprise natural uranium or thorium which not only absorb neutrons to form a fissionable isotope but also serve as a fast neutron reflector. Other elements are also capable of serving as a fast neutron reflector and may be utilized in one or more of the blankets. Such elements are preferably of relatively high atomic number, that is, above 10 to minimize neutron moderation. However, elements having an atomic number of 80 and above which are elements of high scattering cross section such as bismuth, mercury, and lead are preferred as a fast neutron reflecting blanket.

It will also be apparent that the reactor shown in the above figures comprises a central active region surrounded by a blanket of thorium or uranium which blanket itself is surrounded by a second blanket comprising a neutron moderator capable of slowing neutrons to substantial neutrons energies such as carbon, water, deuterium oxide, beryllium or other elements of low thermal neutron cross-section and atomic numbers below about 10. The thorium or uranium blanket not only serves as a fast neutron reflector as above described, but also functions in the nature of a filter or screen for most neutrons of relatively low energies, for example, 0.01 to 10 electron volts. Thus, the fast neutrons leaving the central active area are either reflected or captured by the blanket or passed through the blanket into the neutron moderator where they are slowed to low energies, usually to thermal energies. These low energy neutrons are then available for breeding purposes.

Since the critical size of the reactor operating by virtue of thermal neutrons is substantially smaller than the critical size of a reactor operating by virtue of fast neutrons, that is, for example, of the order 100,000 ev. or above, it is usually desirable to prevent or minimize the return of thermal neutrons into the active area. This is also desirable to minimize the problems of radioactivity hazards in connection with the coolant system and the like. The uranium or thorium blanket serves this function and absorbs most of the thermal neutrons which are reflected inwardly from the neutron moderator blanket.

It will be understood that other means may be utilized to prevent or minimize the return of slow or thermal neutrons into the central fast neutron active area, for example, a blanket of cadmium, barium, gadolinium or other isotope having a high neutron capture cross-section for slow neutrons may be provided between the active area and the neutron moderating blanket for this purpose. Likewise, numerous other high neutron absorbers usually having an atomic number below about 80 may be used for this purpose.

It will be understood that the present invention is not restricted to the specific embodiments disclosed or to the theories of nuclear physics set forth, inasmuch as many modifications of these embodiments may be conceived by those skilled in the art without departing from the spirit of the invention or the scope of the appended claims; and experimental data later discovered may modify the theories set forth without affecting the operativeness of the invention disclosed.

What is claimed is:

1. A neutronic reactor adapted to breed thermally fissionable material from fertile material comprising a less than critical mass with respect to unmoderated neutrons and a greater than critical mass with respect to neutrons of average energy substantially greater than thermal energies of material containing a substantial portion of thermal neutron fissionable material, a liquid coolant comprised of elements selected from the group consisting of sodium and sodium potassium alloys, means for circulating the coolant through the mass, a source of liquid substances comprised of elements selected from the group consisting of lead and lead bismuth alloys, means connecting the source of liquid substances to the mass, and mean for inserting the liquid substances into the central region of the mass, the insertion thereof into the central region of the mass resulting in establishing a greater than critical mass with respect to neutrons of average energy substantially greater than thermal energies, and the withdrawal thereof from the central region of the mass resulting in a less than critical mass whereby a fast neutron chain reaction may be initiated, adapted for optimum breeding of fertile material, and controlled, said entire reactor being substantially free of elements having an atomic number less than 11.

2. A neutronic reactor adapted to breed thermally fissionable material from fertile material comprising a plurality of bodies of fertile material enriched in thermally fissionable material in a ratio of from 1.9:1 to 4:1 disposed in spaced relationships and comprising a less than critical mass with respect to unmoderated neutrons and having a greater than critical mass with respect to neutrons of average energy substantially greater than thermal energies, a liquid coolant comprised of elements selected from the group consisting of sodium and sodium potassium alloys, means for circulating the coolant through the plurality of bodies, a source of liquid substances comprised of elements selected from the group consisting of lead and lead bismuth alloys, means connecting the source of liquid substances to the plurality of bodies, a plurality of tubes disposed within the plurality of bodies, and means for circulating the liquid substances in controlled quantities through the tubes, whereby a fast neutron chain reaction utilizing in a substantial portion neutrons having an average energy substantially greater than thermal energies may be initiated, adapted to optimum breeding of thermally fissionable material from fertile material and controlled by regulating the quantity of liquid substances in the tubes, said entire reactor being subtantially free of elements having at atomic number less than 11.

3. A neutronic reactor adapted to breed thermally fissionable material from fertile material comprising a central core region containing bodies of fertile material enriched in thermally fissionable isotopes in a ratio of from 1.9:1 to 4:1, the core comprised of the total of enriched material being of greater than critical mass with respect to neutrons of average energy substantially greater than thermal energies, fertile material disposed in a layer about the core, a liquid coolant comprised of elements selected from the group consisting of sodium and sodium potassium alloys, means for circulating the coolant through the central core region, a source of liquid substances comprised of elements selected from the group consisting of lead and lead bismuth alloys, means connecting the source of liquid substances to the central core region, means for circulating the liquid substances in controlled quantities through the central core region, and a plurality of rotatable means centered about the periphery of the core comprised of enriched material and fertile material in spaced relationship, the rotatable means upon rotation being adapted to transport fertile material into the core region and to transport enriched material out of the core region and into the region of the layer of fertile material about the core whereby a fast neutron chain reaction utilizing in a substantial portion neutrons having an average energy substantially greater than thermal energies may be initiated, adapted for optimum breeding of thermally fissionable material from fertile material, and controlled by adjusting the reactivity of the core by rotation of the rotatable means, said entire reactor being substantially free of elements having an atomic number less than 11.

References Cited in the file of this patent

UNITED STATES PATENTS

| | | |
|---|---|---|
| 2,708,656 | Fermi et al. | May 17, 1955 |
| 2,743,225 | Ohlinger et al. | Apr. 24, 1956 |

FOREIGN PATENTS

| | | |
|---|---|---|
| 114,150 | Australia | May 2, 1940 |
| 861,390 | France | Oct. 28, 1940 |
| 233,011 | Switzerland | Oct. 2, 1944 |

OTHER REFERENCES

Smyth: "Atomic Energy for Military Purposes," pp. 75, 103, 104, August, 1945.

Kelly et al.: Phy. Rev. 73, 1135–9 (1948).

Journal of Applied Science, Sept. 1939, pages 612–614.

Review of Modern Physics, vol. 12, No. 1, Jan. 1940, pages 17–21.

A Forum Report, Nuclear Reactor Development. Atomic Industrial Forum, 260 Madison Ave, New York 16, N.Y. July 1, 1954, O. Townsend and E. Wiggin, page 18.

The Elements of Nuclear Theory by Samuel Glasstone and M. C. Edlund. D. Van Nostrand Co., New York 1952, page 101.